US011473824B2

(12) United States Patent
Lu et al.

(10) Patent No.: US 11,473,824 B2
(45) Date of Patent: Oct. 18, 2022

(54) HEAT-SOURCE-TOWER HEAT PUMP SYSTEM COMBINED WITH ICE MAKER

(71) Applicants: Chongqing University, Chongqing (CN); Jiangsu Simpsun Air New Energy Co., Ltd., Yangzhou (CN)

(72) Inventors: Jun Lu, Chongqing (CN); Yifei Lv, Chongqing (CN); Fangqi Lu, Chongqing (CN); Ling Xie, Chongqing (CN); Lulu Yang, Chongqing (CN)

(73) Assignees: Chongqing University, Chongqing (CN); Jiangsu Simpsun Air New Energy Co., Ltd., Yangzhou (CN)

( * ) Notice: Subject to any disclaimer, the term of this patent is extended or adjusted under 35 U.S.C. 154(b) by 154 days.

(21) Appl. No.: 17/144,540

(22) Filed: Jan. 8, 2021

(65) Prior Publication Data

US 2021/0222938 A1 Jul. 22, 2021

(30) Foreign Application Priority Data

Jan. 19, 2020 (CN) ......................... 202010062321.X

(51) Int. Cl.
*F25C 5/04* (2006.01)
*F25B 13/00* (2006.01)
*F25C 1/04* (2018.01)

(52) U.S. Cl.
CPC ................ *F25C 5/04* (2013.01); *F25B 13/00* (2013.01); *F25C 1/04* (2013.01)

(58) Field of Classification Search
CPC .. F25B 13/00; F25B 2339/047; F25B 25/005; F25B 30/02; F25C 5/04; F25C 1/04; F25C 1/00
See application file for complete search history.

(56) References Cited

U.S. PATENT DOCUMENTS

| 3,650,121 A * | 3/1972 | Kimpel ................... F25C 1/147 62/136 |
| 4,373,345 A * | 2/1983 | Tyree, Jr. .............. F25B 29/003 62/345 |
| 10,995,975 B2 * | 5/2021 | Kondou ................... F25C 1/145 |
| 11,300,343 B2 * | 4/2022 | Kita ........................... F25C 1/00 |
| 2002/0189270 A1 * | 12/2002 | Stensrud ................... F25C 1/00 62/340 |

(Continued)

FOREIGN PATENT DOCUMENTS

WO WO-2018127712 A1 * 7/2018 ............ F24F 5/0003

*Primary Examiner* — Filip Zec
(74) *Attorney, Agent, or Firm* — Thomas | Horstemeyer, LLP

(57) ABSTRACT

The present disclosure discloses a heat-source-tower heat pump system combined with an ice maker. The system includes a heat source tower and a heat pump unit. The system further includes an ice maker. The liquid outlet of the heat source tower is connected to the liquid inlet of the ice maker through a pipeline. The concentrated liquid outlet of the ice maker is connected to the liquid return port of the heat source tower. The cold outlet of the heat pump unit is connected to the cold inlet of the ice maker through a pipeline. The hot return port of the ice maker is connected to the hot inlet of the heat pump unit through a pipeline. The cold inlet and the hot outlet of the heat pump unit are respectively connected to corresponding outlet and inlet of an end of a user.

3 Claims, 1 Drawing Sheet

(56) References Cited

U.S. PATENT DOCUMENTS

2017/0176077 A1* 6/2017 Knatt .................... F25C 1/12
2018/0335239 A1* 11/2018 Zhou .................... F25C 1/145
2021/0356178 A1* 11/2021 Novek ................... F25C 1/00

* cited by examiner

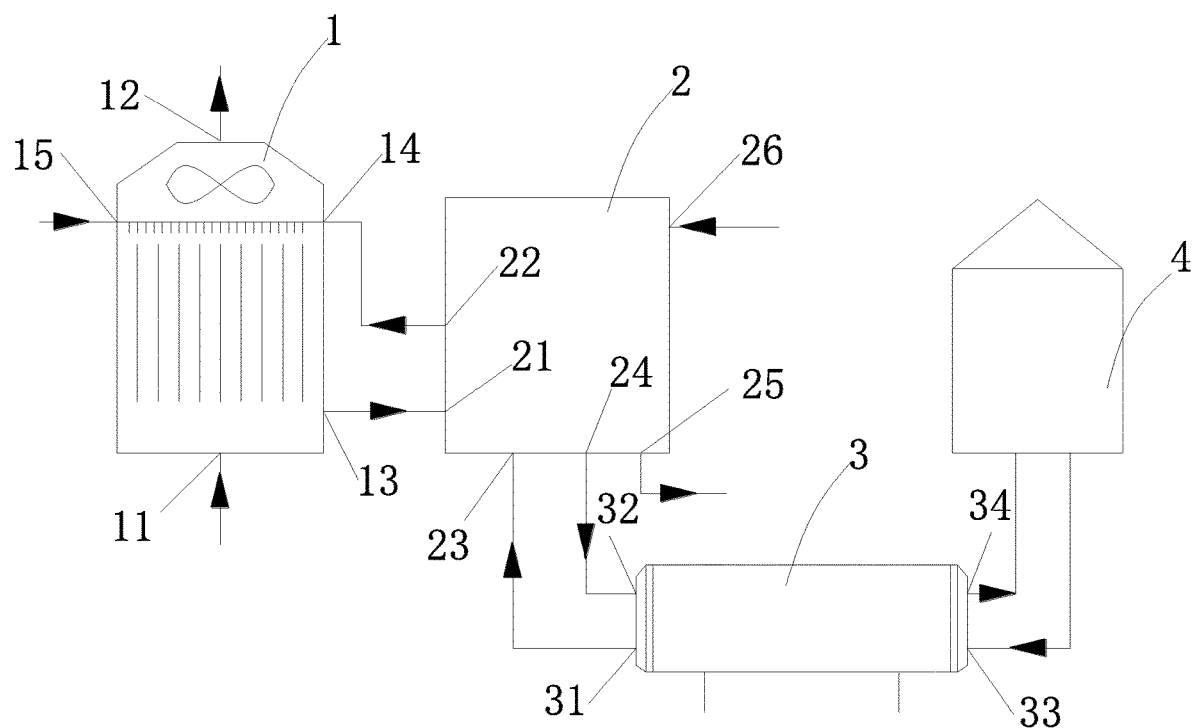

HEAT-SOURCE-TOWER HEAT PUMP SYSTEM COMBINED WITH ICE MAKER

TECHNICAL FIELD

The present disclosure belongs to the technical field of heat exchange, and particularly relates to a heat-source-tower heat pump system combined with an ice maker.

BACKGROUND

With the development of economy and the continuous improvement of living standards, people have higher and higher requirements for the comfort of living and working environment. Especially in the middle and lower reaches of the Yangtze River in China, the summer is hot, the winter is wet and cold, and the whole year is humid. The energy consumption of a building air conditioning system is high, so an energy-saving heat-source-tower heat pump system is developing rapidly.

In summer, the energy-saving heat-source-tower heat pump system runs according to a refrigerating mode of a water cooled water cooling unit in summer, while a cooling tower is converted into a heat-absorbing heat source tower to run in winter. A recycling antifreeze solution in the tower absorbs heat from air, and water molecules in the air also enter the antifreeze solution, so that the antifreeze solution is diluted, thereby rising the freezing point of the antifreeze solution. In order to ensure normal running of the heat pump unit, it is necessary to concentrate the diluted antifreeze solution. The concentration of the diluted antifreeze solution is realized by the existing heat-source-tower heat pump system by means of adding a solution concentration device. However, the cost of the solution concentration device is high, which undoubtedly increases the cost of the equipment.

SUMMARY

With respect to the above-mentioned disadvantages in the prior art, the objective of the present disclosure is to provide an energy-saving and low-cost heat-source-tower heat pump system combined with an ice maker.

The technical solution of the present disclosure is realized as follows:

A heat-source-tower heat pump system combined with an ice maker includes a heat source tower and a heat pump unit. A liquid return port, a liquid outlet, an air inlet, and an air outlet are formed in the heat source tower. The air inlet is used for outdoor air to enter the heat source tower to perform heat exchange with an antifreeze solution. The air outlet is used for exhausting the air which is subjected to the heat exchange with the antifreeze solution from the heat source tower. A first evaporation channel and a first condensation channel are formed in the heat pump unit. A cold inlet and a hot outlet which are communicated with the first condensation channel, and a cold inlet and a hot outlet which are communicated with the first condensation channel are formed in the heat pump unit. An ice maker is arranged between the heat source tower and the heat pump unit. A second evaporation channel and a second condensation channel are formed in the ice maker. A liquid inlet and a concentrated liquid outlet which are communicated with the second evaporation channel, and a cold inlet and a hot return port which are communicated with the second condensation channel are formed in the ice maker. An ice removal port and a water replenishing port are formed in the ice maker. The ice removal port is used for removing ice cubes from the surface of an evaporator of the ice maker.

The liquid outlet of the heat source tower is connected to the liquid outlet of the ice maker through a pipeline, and the concentrated liquid outlet of the ice maker is connected to the liquid return port of the heat source tower, so that an antifreeze solution condensation concentration channel is formed. The cold outlet of the heat pump unit is connected to the cold inlet of the ice maker through a pipeline. The hot return port of the ice maker is connected to the hot inlet of the heat pump unit through a pipeline. The cold inlet and the hot outlet of the heat pump unit are respectively connected to corresponding outlet and inlet of an end of a user.

Further, a liquid replenishing port is formed in the heat source tower, and is used for replenishing and adding a solute of the antifreeze solution.

Further, the ice maker is a water cooled ice maker.

Compared with the prior art, the heat-source-tower heat pump system combined with an ice maker has the following beneficial effects:

1. The heat-source-tower heat pump system combined with an ice maker adopts a low-cost ice maker to replace a high-cost solution concentration device to concentrate the antifreeze solution, which reduces the input cost, and can also absorb the heat absorbed from the air by the antifreeze solution when the ice maker concentrates the antifreeze solution, so that the antifreeze solution turns into a low temperature antifreeze solution and continues to flow back into the heat source tower to absorb the heat from the air, thereby effectively realizing recycling and regenerating of the antifreeze solution.

2. In the heat-source-tower heat pump system combined with an ice maker, the ice maker is arranged between the heat source tower and the heat pump unit, and concentration waste heat of the ice maker can drive the heat pump unit and supply energy in combination with the heat pump unit, which is beneficial to improving the heat supply temperature of the end of the user, thereby saving the energy consumption.

BRIEF DESCRIPTION OF THE DRAWINGS

FIG. 1 is a schematic structural diagram of the present disclosure.

In the drawing: 1—heat source tower; 11—air inlet; 12—air outlet; 13—liquid outlet; 14—liquid return port; 15—liquid replenishing port; 2—ice maker; 21—liquid inlet; 22—concentrated liquid outlet; 23—cold inlet; 24—hot return port; 25—ice removal port; 26—water replenishing port; 3—heat pump unit; 31—cold outlet; 32—hot inlet; 33—cold inlet; 34—hot outlet; 4—user.

DETAILED DESCRIPTION

The present disclosure will be further described in detail below with reference to the accompanying drawing and specific implementation manners.

Referring to FIG. 1, a heat-source-tower heat pump system combined with an ice maker includes a heat source tower 1 and a heat pump unit 3. A liquid return port 14, a liquid outlet 13, an air inlet 11, and an air outlet 12 are formed in the heat source tower 1. The air inlet 11 is used for outdoor air to enter the heat source tower 1 to perform heat exchange with an antifreeze solution. The air outlet 12 is used for exhausting the air which is subjected to the heat exchange with the antifreeze solution from the heat source tower 1. A first evaporation channel and a first condensation channel are formed in the heat pump unit 3. A cold inlet 31 and a hot outlet 32 which are communicated with the first condensation channel, and a cold inlet 33 and a hot outlet 34 which are communicated with the first condensation channel are formed in the heat pump unit 3. An ice maker 2 is arranged between the heat source tower 1 and the heat pump unit 3. A second evaporation channel and a second condensation channel are formed in the ice maker 2. A liquid inlet 21 and a concentrated liquid outlet 22 which are communicated with the second evaporation channel, and a cold inlet 23 and a hot return port 24 which are communicated with the second condensation channel are formed in the ice maker 2. An ice removal port 25 and a water replenishing port 26 are formed in the ice maker. The ice removal port 25 is used for removing ice cubes from the surface of an evaporator of the ice maker.

The liquid outlet 13 of the heat source tower 1 is connected to the liquid outlet 21 of the ice maker 2, and the concentrated liquid outlet 22 of the ice maker 2 is connected to the liquid return port 14 of the heat source tower 1 to form an antifreeze solution condensation concentration channel. The cold outlet 31 of the heat pump unit 3 is connected to the cold inlet 23 of the ice maker 2 through a pipeline. The hot return port 24 of the ice maker 2 is connected to the hot inlet 32 of the heat pump unit 3 through a pipeline. The cold inlet 33 and the hot outlet 34 of the heat pump unit 3 are respectively connected to corresponding outlet and inlet of an end of a user 4.

The adopted antifreeze solution is one of the conventional antifreeze solutions, such as calcium chloride solution and glycol solution.

The ice maker consists of a compressor, an evaporator, a condenser, and other components.

In the heat source tower, the air performs heat exchange with the antifreeze solution. The air transfers heat to the antifreeze solution, so that the temperature of the antifreeze solution rises. Meanwhile, water molecules in the air enter the antifreeze solution to dilute the antifreeze solution, so that the freezing point of the antifreeze solution rises, for example, the freezing point of the calcium chloride solution is minus 20 DEG C., while the freezing point of the diluted calcium chloride solution is minus 15 DEG C.

After the antifreeze solution enters the ice maker, during an ice making process of the ice maker, high temperature and high pressure refrigerant vapor is discharged into the condenser of the ice maker through the compressor of the ice maker, is condensed into a high pressure liquid, then is intercepted by an expansion valve of the ice maker to turn into a low temperature and low pressure liquid-vapor mixture. The low temperature and low pressure liquid-vapor mixture enters the evaporator of the ice maker. The refrigerant in the evaporator of the ice maker turns into low temperature and low pressure gas after absorbing the heat of the antifreeze solution, and then is sucked into the compressor of the ice maker to complete a complete ice-making cycle.

During an ice making cycle, in the second evaporation channel, the evaporator of the ice maker absorbs the heat of the antifreeze solution, so that the temperature of the antifreeze solution drops to the temperature around the freezing point of the antifreeze solution. At this time, due to high freezing point of water, the part of water absorbed by the antifreeze solution from the air is quickly separated out and forms ice cubes on the evaporator of the ice maker. The antifreeze solution cannot be separated out due to its high freezing point. Therefore, the antifreeze solution entering the ice maker is concentrated and is cooled at the same time, and then the low-temperature antifreeze solution is formed and flows back to the heat source tower to continue to absorb the heat from the air. For example, the freezing point of the diluted calcium chloride solution is minus 15 DEG C., and the temperature is drops to be between minus 15 and minus 20 DEG C. by controlling the ice maker. At this time, the part of the water absorbed from the air is almost separated out. Since the amount of the water absorbed by the antifreeze solution in the heat source tower is little, the ice cubes in the ice maker may be removed regularly after the system has been running for a period of time.

During the ice making cycle, in the second condensation channel, the refrigerant vapor is condensed into a high pressure liquid by the condenser of the ice maker, which needs to release a large amount of heat and then transfers heat with the cold air or cold water entering the ice maker from the heat pump unit, thereby turning into air and water with high temperature.

In the evaporation channel of the heat pump unit, the air and water with risen temperatures entering the evaporation channel of the heat pump unit from the ice maker release heat, so that the air and water are cooled into cold air and cold water, and then enter the ice maker to continue to absorb heat; in the condensation channel, the cold air or cold water entering the heat pump unit at the end of the user absorbs heat and forms high temperature air and high temperature water to meet the heating requirements of the end of the user.

Here, the objective of forming the water replenishing port on ice maker 2 is that when the heat source tower stops running, there is no antifreeze solution entering the ice maker, which is easy to damage the ice maker, so the damage of the ice maker may be effectively avoided by replenishing water timely.

In specific implementation, a liquid replenishing port is formed in the heat source tower, and is used for replenishing and adding a solute of the antifreeze solution.

When the water is separated out in an ice making process, there is still a small amount of a solute of the antifreeze solution separated out. To prevent the concentration of the antifreeze solution from being reduced, the freezing point of the antifreeze solution rises, the concentration of the antifreeze solution must be measured periodically, and the solute of the antifreeze solution is added, so that the concentration of the antifreeze solution is proper.

In specific implementation, the ice maker is a water cooled ice maker.

The adopted ice maker is a conventional water cooled ice maker. It is just that the conventional water cooled ice maker is to make ice by introducing water, while the ice maker in the present disclosure is to introduce the antifreeze solution.

Finally, it should be noted that, the above-mentioned embodiment of the present disclosure is merely an example to illustrate the present disclosure, but is not intended to limit the implementation manner of the present disclosure. For those of ordinary skill in the art, other different forms of variations and changes may also be made on the basis of the above-mentioned description. There is no exhaustive list of all of the implementation manners. All obvious variations and changes derived by the technical solutions of the present disclosure are still within the scope of protection of the present disclosure.

What is claimed is:

1. A heat-source-tower heat pump system combined with an ice maker, comprising a heat source tower and a heat pump unit, wherein a liquid return port, a liquid outlet, an air inlet, and an air outlet are formed in the heat source tower;

the air inlet is used for outdoor air to enter the heat source tower to perform heat exchange with an antifreeze solution; the air outlet is used for exhausting the air which is subjected to the heat exchange with the antifreeze solution from the heat source tower; a first evaporation channel and a first condensation channel are formed in the heat pump unit; a cold inlet and a hot outlet which are communicated with the first condensation channel, and a cold inlet and a hot outlet which are communicated with the first condensation channel are formed in the heat pump unit, wherein an ice maker is arranged between the heat source tower and the heat pump unit; a second evaporation channel and a second condensation channel are formed in the ice maker; a liquid inlet and a concentrated liquid outlet which are communicated with the second evaporation channel, and a cold inlet and a hot return port which are communicated with the second condensation channel are formed in the ice maker; an ice removal port and a water replenishing port are formed in the ice maker; the ice removal port is used for removing ice cubes from the surface of an evaporator of the ice maker; the liquid outlet of the heat source tower is connected to the liquid outlet of the ice maker, and the concentrated liquid outlet of the ice maker is connected to the liquid return port of the heat source tower to form an antifreeze solution condensation concentration channel; the cold outlet of the heat pump unit is connected to the cold inlet of the ice maker through a pipeline; the hot return port of the ice maker is connected to the hot inlet of the heat pump unit through the pipeline; the cold inlet and the hot outlet of the heat pump unit are respectively connected to corresponding outlet and inlet of a user end.

2. The heat-source-tower heat pump system combined with an ice maker according to claim 1, wherein a liquid replenishing port is formed in the heat source tower, and is used for replenishing and adding a solute of the antifreeze solution.

3. The heat-source-tower heat pump system combined with an ice maker according to claim 1, wherein the ice maker is a water cooled ice maker.

* * * * *